United States Patent [19]

Diehl, Jr. et al.

[11] Patent Number: 4,551,293
[45] Date of Patent: Nov. 5, 1985

[54] METHOD OF FORMING SPARK PLUG BOOTS

[75] Inventors: Larry F. Diehl, Jr.; Robert M. Gibbon, both of Fort Worth, Tex.

[73] Assignee: Jamak, Inc., Weatherford, Tex.

[21] Appl. No.: 586,337

[22] Filed: Mar. 5, 1984

[51] Int. Cl.⁴ .............................................. B29H 5/01
[52] U.S. Cl. ................................ 264/150; 264/526; 264/531; 264/230; 264/236; 264/294; 264/DIG. 59; 425/326.1; 425/387.1; 425/393
[58] Field of Search .............. 264/150, 236, 347, 230, 264/294, DIG. 59, DIG. 71, DIG. 73, 526, 531; 425/812, 387.1, 393, 326.1

[56] References Cited

U.S. PATENT DOCUMENTS

| | | | |
|---|---|---|---|
| 1,724,354 | 8/1929 | Kraft | 264/573 |
| 2,301,686 | 11/1942 | Doran | 264/150 |
| 2,355,443 | 8/1944 | Jeffery | 264/DIG. 71 |
| 2,671,889 | 3/1954 | Vickery | 264/DIG. 71 |
| 2,782,459 | 2/1957 | Moncrieff | 264/573 |
| 3,063,100 | 11/1962 | Kohring | 264/DIG. 71 |
| 3,205,290 | 9/1965 | Covington, Jr. et al. | 264/DIG. 73 |
| 3,714,311 | 1/1973 | Stefanka | 264/236 |
| 3,972,548 | 8/1976 | Roseen | 264/DIG. 71 |
| 4,061,704 | 12/1977 | Barter | 264/236 |

Primary Examiner—Jeffery Thurlow
Attorney, Agent, or Firm—James E. Bradley

[57] ABSTRACT

A method of forming a spark plug boot which utilizes an extrusion process. An elastomeric tube is extruded, then heated to a partially cured condition. The tube is then cut into individual pieces. The individual pieces are stretched over a pin which has at least one external shoulder. The pin and tube are then heated to a temperature and for a time to provide a final cure. The tube is stripped from the pin. The compression set and shrinkage results in an internal shoulder in the tube, allowing it to serve as a spark plug boot.

6 Claims, 4 Drawing Figures

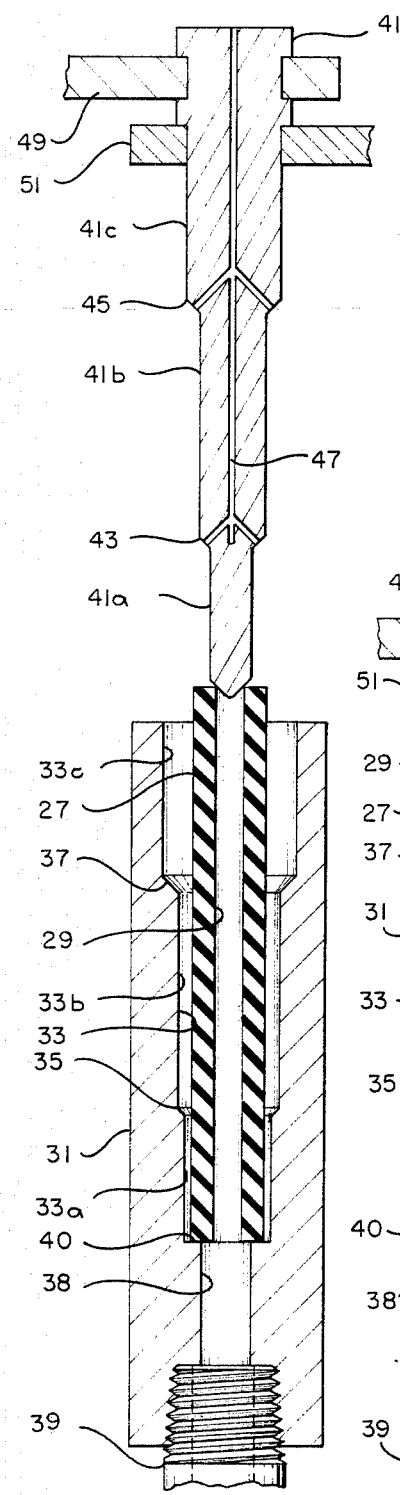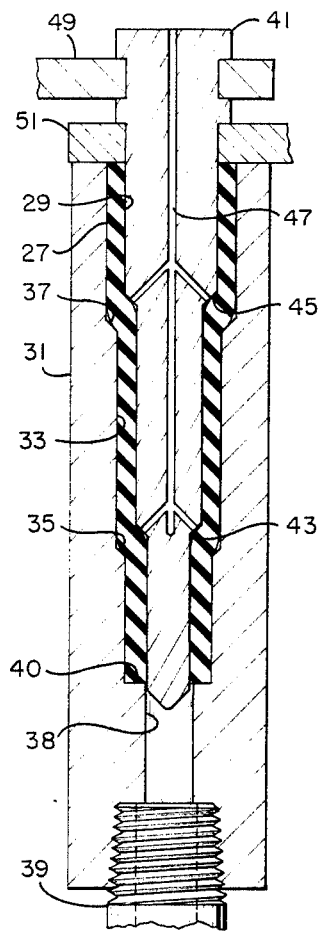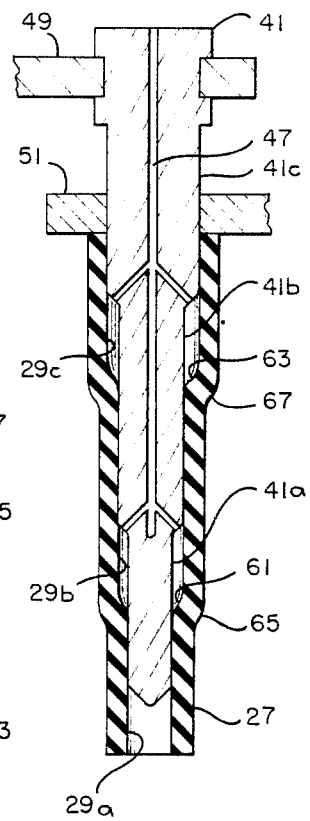

METHOD OF FORMING SPARK PLUG BOOTS

BACKGROUND OF THE INVENTION

1. Field of the Invention

This invention relates in general to forming elastomeric tubular articles, and in particular to a method of forming spark plug boots utilizing an extrusion process.

2. Description of the Prior Art

A spark plug boot is an elastomeric tubular member that slides over a spark plug of an internal combustion engine to serve as an insulator. One end of the boot slides over the spark plug wire, while the other end of the boot, which is larger, slides over the spark plug. There is at least one internal shoulder within the boot, and at least two internal diameters. The majority of the boots are made from silicone rubber but some are made from organic materials.

Spark plug boots are normally made by injection molding. Rubber material is loaded into an injection molding press, which injects the material into the cavity of a mold and heats to cure. The boots thus formed are stripped from the mold and subsequently frozen by nitrogen to make the boots very hard. The frozen boots are tumbled to remove flashing and scrap. After warming to room temperature, the boots will soften to the desired hardness. While this process results in high quality boots, the injection molding, freezing and tumbling steps are expensive.

SUMMARY OF THE INVENTION

In this invention, spark plug boots are formed by a method other than by injection molding. First, elastomeric material is extruded into a tube of uniform internal diameter. This tube is vulcanized to a partial cure. The partial cure provides a hardness that is below the final hardness, but sufficient for cutting the tube into individual pieces. Once cut into pieces, the tubes are loaded into a carrier. A pin having multiple diameters is then pressed into each tube, with the carrier providing external support as the tube is stretched over the pin. To reduce friction, air pressure is applied to one end of the tube.

After the pin is fully loaded into the tube, the pin and tube are removed from the carrier and heated. The tube at this point reaches its final cure and final hardness. Shrinkage and compression set cause the tube to take an interior shape of multiple inner diameters conforming to the pin. The tube is stripped from the pin, cooled and is ready for shipment.

BRIEF DESCRIPTION OF THE DRAWINGS

FIG. 2 is a sectional partially schematic view illustrating a pin being loaded into an elastomeric tube, one of the steps of this invention.

FIG. 3 is a view similar to FIG. 2, but shown with the pin in the fully loaded position.

FIG. 4 is a view similar to FIG. 3, but shown removed from the loading carrier, and with the tube being stripped from the pin.

DESCRIPTION OF THE PREFERRED EMBODIMENT

Figure 1:
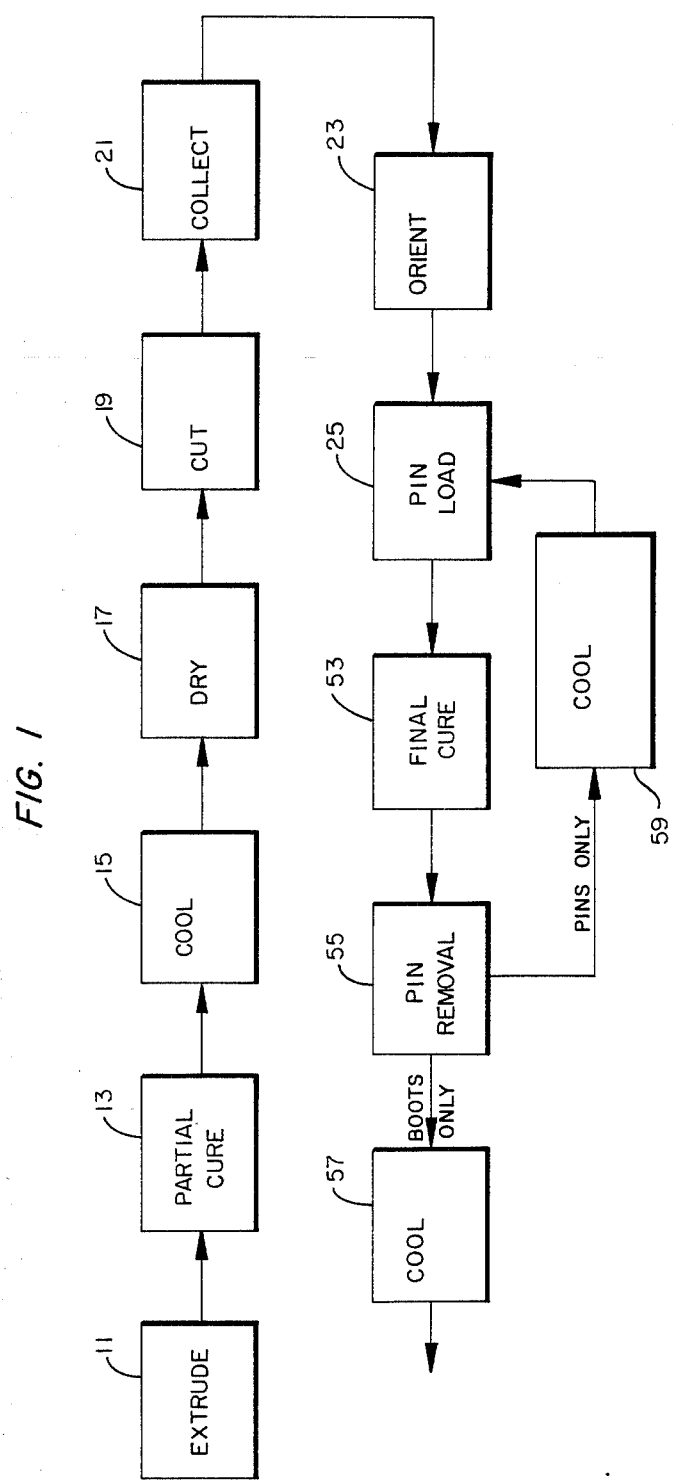
FIG. 1 is a block diagram illustrating the steps of the method of this invention.

Referring to FIG. 1, the first step 11 is to extrude a continuous tube of the particular elastomeric composition desired. The vulcanizable elastomeric composition useful in practicing the present invention will include any curable materials capable of being formed by the method to the required shape. Silicone rubber compositions are preferred because of their stability at elevated temperatures and resistance to contamination by engine fumes, leakage and the like. A typical composition of the type known in the art will contain about 100 parts silicone polymer, about 40 parts filler, from about 0.5 to 2.0 parts catalyst, and 0 to 10 parts of other enhancement additives.

Typical silicone polymers will include dimethyl polysiloxane polymers with optional vinyl groups replacing methyl groups on the polymer chain. The vinyl level will be about 0 to 5 mole percent with the molecular weight of the polymer typically being above one million.

Typical fillers include fume silica, precipitated silica, ground quartz, calcium carbonate and iron oxide. Other conventional enhancement additives can be present as well, such as heat stabilizers, structure control additives, process aids and pigments.

The following example is intended to be illustrative of the elastomer compositions which can be used to practice the preferred invention:

| Methyl vinyl polysiloxane gum | | |
|---|---|---|
| 0.2 (mole percent vinyl content) | 49.0 | parts |
| structural control additives | 2.0 | parts |
| fume silica | 6.2 | parts |
| precipitated silica | 6.2 | parts |
| rare earth octoate | 0.2 | parts |
| accelerator Vi(MeO)$_3$Si | 0.1 | parts |
| ground quartz SiO$_2$ | 36.3 | parts |
| Total | 100 | parts |

The preferred compositions also contain a primary catalyst which is heat activated at about 250° F. and a secondary catalyst which is heat activated at about 350° F. to achieve a 2-step cure as follows:

Primary Catalyst
  2:4 Dichlorobenzoyl peroxide: 0.5 parts/100 parts elastomer composition Secondary Catalyst
  Dicumyl peroxide: 1.0 part/100 parts elastomer composition The extruder for extrusion step 11 is a conventional extruder and feeds the tube thus formed into a continuous vulcanizer for a partial cure step 13. The continuous vulcanizer in step 13 must vulcanize the tube uniformly on all sides to a partial cure. The cure must be sufficient such that the material can be cut and formed as described subsequently. Preferably, the continuous tubing formed is cured to about 80% of the final or full desired cure. In the above example, the desired hardness is about 55–60 durometer when fully cured, and the tube is partially cured by the continuous vulcanizer in step 13 to about 45 to 50 durometer hardness.

The continuous vulcanizer for step 13 is preferably a liquid medium such as eutectic salt bath through which the tube is drawn. The salt bath is conventional and contains liquid salt at a temperature from 350° to 450° F. The viscosity of the salt at operating temperatures will be similar to water. Normally, the tube will cure to 80% of the final cure in about 20 seconds immersion in the salt bath. Only the primary catalyst is activated in step 13 because the temperature of the tube does not reach a level for a sufficient time needed to activate the secondary catalyst.

After the partial cure step 13, the continuous tube proceeds through a cooling step 15, which preferably uses a water trough with water at ambient temperature. The continuous tube then is pulled through a drying step 17, which dries the water from the continuous tube by means of air jets. From drying step 17, the continuous tube passes to a cutting step 19, which cuts the tube into lengths approximately the length of the desired spark plug boot. Generally, the length will be about three inches. The tubes then are collected in step 21. From collecting steps 21, the tubes are oriented in step 23. The device to orient may be of many types, and serves to orient the tubes with their axes generally parallel and facing downward. From orienting step 23, the pin loading step 25 is next performed.

Referring to FIG. 2, each tube 27 at this point will have a longitudinal passage 29 with a uniform, constant inner diameter. The outer diameter may be cylindrical, or other shapes such as triangular or hexagonal. The tube will be slightly longer than its final length when formed into the spark plug boot, and its wall thickness will be slightly greater than the final wall thickness. In the pin loading step 25 (FIG. 1), each tube 27 is loaded into carrier 31. In practice, several carriers 31, each containing a tube 27 would be used.

Carrier 31 has a cavity or bore 33 for tube 27. Bore 33 has a length that is slightly less than the length of tube 27. Bore 33 has at least two diameters, and is shown in the embodiment of FIG. 2 as having three different diameters. These include a lower section 33a with the smallest diameter, a middle or intermediate section 33b with an intermediate diameter, and an upper section 33c that has the largest diameter. This results in two internal upwardly facing shoulders 35 and 37. Shoulders 35 and 37 taper downwardly, both being frusto-conical. Bore 33 joins a coaxial air passage 38 on its lower end, which is connected to a source of air pressure 39 which supplies air pressure at about 100 psi. Air passage 38 is smaller in diameter than lower section 33a, defining a shoulder 40. Tube 27 will fit loosely within the bore 33, with the outer diameter of tube 27 being slightly less than the diameter of the lower section 33a, but greater than the air passage 38. The lower end of tube 27 rests on shoulder 40, and the upper end of tube 27 initially protrudes above carrier 31.

A pin 41 is adapted to be inserted into the tube 27. Pin 41 is a contour pin used to form the tube 27 into the desired shape. Pin 41 is preferably a steel pin, having at least two diameters, and shown in the preferred embodiment as having three diameters. This includes a tip or lower section 41a of the smallest diameter, an intermediate section 41b of larger diameter, and a base or upper section 41c with the largest diameter. The smallest diameter section 41a is greater in diameter than the internal diameter of the tube 27, but is less than the diameter of the air passage 38. The different diameters of pin 41 result in two shoulders 43 and 45, each of which face downwardly and each of which are tapered or frustoconical. Bleed off passages 47 formed in pin 41 lead from the shoulders 43 and 45 to the top of the pin to allow the escape of air pockets and curing gases. Pin 41 is carried by a support plate 49. A stripper plate 51 fits closely about the upper portion 41c of the pin 41. Stripper plate 51 will move upwardly and downwardly with respect to pin 41.

In the pin load step 25 (FIG. 1), the tube 27 is pushed over pin 41 by moving the carrier 31 toward pin 41. To prevent buckling of the tube during this insertion, air pressure from air source 39 is simultaneously applied to the lower end of tube 27. As the tube 27 moves over the pin 41, the air pressure will enlarge the tube 27 radially outward to facilitate the entry of the pin 41. Bore 33 of the carrier 31 will restrain the amount of outward expansion of tube 27 due to the air pressure. When fully loaded, as shown in FIG. 3, the top of tube 27 will be flush with the top of carrier 31 and in contact with the stripper plate 51. The pin shoulders 43 and 45 will be located a short distance above the bore shoulders 35 and 37, respectively. The lower end of pin 41 will protrude below the lower end of the tube 27 into the air passage 28. Air pressure is removed at this point. The bore 33 diameters are sufficiently greater than the pin 41 diameters so that the tube 27 will not be under radial compression when pin 41 is loaded and located in bore 33.

Then, the carrier 31 will move away from the pin 41, leaving the tube 27 stretched over the pin 41. Then, as shown in FIG. 1, the tube 27, while stretched over the pin 41, is fully vulcanized as indicated by step 53 in FIG. 1. In this step, the tube 27 will be heated again, but for a time and temperature sufficient to cause it to cure to the fully desired amount. In the preferred embodiment, the final cure is to a hardness of 55 to 60 durometer. The heating in step 53 may be in a separate heating area from the salt bath of step 13, or it may be in the same salt bath, with the final cure made possible by leaving the tube 27 in for a longer duration. In one embodiment, the tube 27 and pin 41 are immersed in the same salt bath as step 13 and at the same temperature, but for a duration of about two minutes. This causes the second catalyst to activate in the silicone rubber composition, resulting in a full cure.

After step 53, the pins are removed in step 55, as shown in FIG. 1. In the pin removal step 55, as shown in FIG. 4, the stripping plate 51 is moved downwardly with respect to the pin 41. This pushes the tube 27 off the pin 41. Tube 27, then is cooled and washed as indicated by step 57. The cooling could be by air, or again by water trough. Pins 41 are cooled in step 59 and returned back to the pin loading step 25 for loading the next batch of tubes 27.

The finally cured tube 27 is not shown completely stripped from pin 41, but will have a configuration generally as shown in FIG. 4. It will have a lower bore portion 29a, an intermediate bore portion 29b and an upper bore portion 29c. The bore portions 29b and 29c will have respectively greater diameters than the bore portion 29a. This results in two upwardly facing internal shoulders 61 and 63 for conforming with a spark plug and cable connection parts (not shown). Also, the exterior of the tube 27, which can now be referred to as a boot, will have three outer diameters, resulting in two exterior shoulders 65 and 67.

The tube 27 forms in the desired shape through shrinkage of about 1% to 2% and compression set in the vulcanizing step 53. When stripped from the pin 41, the tube 27 will contract to a smaller diameter than that of the pin 41, but will retain the desired shape. The particular amount of stretch in the wall thicknesses depends upon the configuration of the desired boot. In one embodiment, the tube 27 has initial inner diameter of 0.260 inch. The pin 41 has diameters 41a, 41b and 41c of 0.270 inch, 0.390 inch and 0.512 inch respectively. After stripping from the pin 41, the tube will have inner diameters 29a, 29b and 29c of 0.270 inch, 0.325 inch and 0.355 inch. The final wall thickness will have a minimum of 0.080 inch, and preferably be in the range from 0.085 to 0.088 inch.

The invention has significant advantages. Forming a spark plug boot by an extrusion process as described avoids flash and scrap that occurs during injection molding. The tubes do not have to be frozen, tumbled and hand inspected as in the prior art. This should make the process less expensive.

While the invention has been shown in only one of its forms, it should be apparent to those skilled in the art that it is not so limited but is susceptible to various changes without departing from the scope of the invention.

We claim:

1. A method of forming a tubular elastomeric member with at least one internal shoulder, comprising:
    extruding a tube from a selected uncured elastomeric material; then
    heating the tube to vulcanize it to a partially cured condition to increase the hardness of the tube sufficiently to enable it to be cut and stretched a selected amount;
    cutting the tube into individual tubular members;
    placing each piece of the tubular member into a bore of a carrier;
    providing a pin with a base and a tip of smaller diameter than the base but with greater diameter than the inner diameter of the tubular member and at least one external shoulder, and providing the pin with a bleed off passage leading from the external shoulder to the exterior of the pin;
    inserting the pin into the tubular member while simultaneously applying air pressure into the tubular member to expand and stretch the tubular member over the pin, allowing trapped air to bleed off through the bleed off passage, with the carrier limiting the expansion of the tubular member due to the air pressure; then
    removing the pin from the bore of the carrier with the tubular member stretched thereon and heating the pin and tubular member to vulcanize the tubular member to a desired cure, retaining an internal shoulder in the tubular member at the point of the external shoulder of the pin; and
    stripping the tubular member from the pin and cooling the tubular member.

2. A method of forming a spark plug boot with at least one internal shoulder, comprising:
    extruding a tube with a constant inner diameter from selected uncured elastomeric material; then
    heating the tube to vulcanize it to a partially cured condition to increase the hardness of the tube sufficiently to enable it to be cut and stretched a selected amount;
    cutting the tube into individual tubular members;
    placing each tubular member into a bore of a carrier, which has at least one counterbore, providing at least one internal shoulder to assist in providing an external shoulder in the tubular member;
    providing a pin with a base and a tip of smaller diameter than the base but greater diameter than the inner diameter of the tubular member and at least one external shoulder that locates adjacent the internal shoulder of the carrier bore when the pin is fully inserted into the carrier bore, and providing the pin with a bleed off passage leading from the external shoulder to the exterior of the base;
    inserting the pin into the tubular member while simultaneously applying air pressure into the tubular member, stretching the tubular member radially to facilitate insertion of the pin, with the bore of the carrier limiting the amount of stretch of the tubular member due to air pressure and with trapped air bleeding off through the bleed off passage;
    removing the pin from the bore of the carrier with the tubular member stretched thereon, and heating the pin and the tubular member to vulcanize the tubular member to a full cure, retaining an internal shoulder in the tubular member at the external shoulder of the pin and an external shoulder in the tubular member adjacent the internal shoulder in the tubular member; and
    stripping the tubular member from the pin and cooling the tubular member.

3. The method according to claim 2 wherein the tubular member is formed of silicone rubber.

4. The method according to claim 3 wherein the partial cure step provides a hardness of the tubular member of about 45 to 50 durometer, and the final cure provides a hardness of the tubular member of about 55 to 60 durometer.

5. A method of forming a spark plug boot with at least one internal shoulder, comprising:
    preparing a vulcanizable elastomer composition containing primary and secondary heat activated catalysts;
    extruding a tube from the elastomer composition;
    heating the tube to a temperature sufficient to activate the primary catalyst and thereby vulcanize the tube to a partially cured condition to increase the hardness of the tube sufficiently to enable it to be cut and stretched a selected amount; then
    cutting the tube into individual tubular members;
    stretching the tubular member over a pin which has at least one external shoulder;
    heating the pin with the tubular member thereon at a temperature and for a time sufficient to activate the secondary heat activated catalyst and thereby vulcanize the tubular member to a greater degree of cure to reach the desired final hardness of the tube; then
    stripping the tubular member from the pin.

6. A method of forming a tubular elastomeric member with an inner diameter of variable dimension, comprising:
    preparing a vulcanizable elastomer material containing primary and secondary heat activated catalysts;
    extruding a tube with a constant inner diameter from the elastomeric material; then
    heating the tube to a temperature sufficient to activate the primary catalyst to vulcanize it to a partially cured condition for increasing the hardness of the tube sufficiently to enable it to be cut and stretched a selected amount; and
    cutting the tube into individual tubular members; then
    providing a pin which has an exterior configuration the same as the desired inner diameter;
    stretching the tubular member over the pin while simultaneously applying air pressure into the tubular member, stretching the tubular member radially to facilitate insertion of the pin;
    heating the pin with the tubular member thereon at a temperature and for a time sufficient to activate the secondary catalyst to vulcanize the tubular member to a greater degree of cure for reaching the desired final hardness of the tube and to provide a permanent inner diameter in the tubular member of a desired shape; then
    stripping the tubular member from the pin.

* * * * *